US010862347B2

(12) United States Patent
Jiang et al.

(10) Patent No.: US 10,862,347 B2
(45) Date of Patent: Dec. 8, 2020

(54) SYSTEMS AND METHODS FOR OBJECT DETECTION

(71) Applicant: Avago Technologies International Sales Pte. Limited, Singapore (SG)

(72) Inventors: Yongjie Jiang, Fort Collins, CO (US); Mark Rutherford, Fort Collins, CO (US); John Walley, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 92 days.

(21) Appl. No.: 16/172,382

(22) Filed: Oct. 26, 2018

(65) Prior Publication Data

US 2019/0319492 A1    Oct. 17, 2019

Related U.S. Application Data

(60) Provisional application No. 62/659,020, filed on Apr. 17, 2018.

(51) Int. Cl.
*H02J 50/60* (2016.01)
*H02J 50/90* (2016.01)
*H02J 50/10* (2016.01)

(52) U.S. Cl.
CPC ............. *H02J 50/60* (2016.02); *H02J 50/10* (2016.02); *H02J 50/90* (2016.02)

(58) Field of Classification Search
CPC ............. H02J 50/60; H02J 50/90; H02J 50/10
See application file for complete search history.

(56) References Cited

U.S. PATENT DOCUMENTS

| 2015/0145529 | A1 | 5/2015 | Urano |
| 2017/0098149 | A1* | 4/2017 | Kesler ...................... H02J 50/12 |
| 2017/0117756 | A1* | 4/2017 | Muratov ................. H02J 50/60 |
| 2019/0162686 | A1* | 5/2019 | Yang ..................... G01N 27/025 |

FOREIGN PATENT DOCUMENTS

WO    WO-2017/176128 A1    10/2017

OTHER PUBLICATIONS

Extended European Search Report on EP 19168803.5 dated Aug. 14, 2019 (17 pages).
Extended European Search Report for European Application No. 19168804.3, dated Jul. 10, 2019, 8 pages.
Partial European Search Report for European Application No. 19168803.5, dated Jul. 10, 2019, 20 pages.

* cited by examiner

*Primary Examiner* — Jared Fureman
*Assistant Examiner* — Duc M Pham
(74) *Attorney, Agent, or Firm* — Foley & Lardner LLP

(57) ABSTRACT

Systems and methods for object detection are provided. The system includes at least a coil, a main transmit inverter circuit, and one or more circuits. The one or more circuits are configured to generate a small signal, provide the small signal to the coil, receive a response signal, compare the response signal with one or more reference signals, and detect an object according to the comparison. The object is detected without providing a signal from the main transmit/receive inverter circuit to the coil.

20 Claims, 3 Drawing Sheets

SYSTEMS AND METHODS FOR OBJECT DETECTION

CROSS-REFERENCE TO RELATED APPLICATIONS

This application claims the benefit of and priority to U.S. Provisional Application No. 62/659,020, filed on Apr. 17, 2018, which is hereby incorporated by reference herein in its entirety.

FIELD OF THE DISCLOSURE

This disclosure generally relates to systems and methods for object detection, including but not limited to systems and methods for object detection for wireless power transmitter and receiver units.

BACKGROUND OF THE DISCLOSURE

Wireless charging system includes a wireless power transmitter unit and one or more wireless power receiver units. When a wireless power receiver unit is close to a wireless power transmitter unit, the wireless transmitter unit determines whether to transmit power to the wireless power receiver unit without user interaction.

Before the power transferring starts, the wireless power transmitter unit discovers the wireless power receiver unit without waking up the wireless power receiver unit or starting digital communications to the wireless power receiver unit. The wireless power transmitter unit uses power inverter circuits to execute a few pings to excite a coil of the wireless charging system and measure a response from the coil and determine if the power receiver unit is present in the field based on the measurement.

Additionally, if foreign objects (e.g., metals, RFID tags) are present in the field, the power transmitter unit can potentially raise the temperature of a foreign object that is placed within the field. The power transmitter unit needs to respond to the detection result (i.e., terminate the power transfer if a foreign object is detected) in order to avoid overheating the foreign objects.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
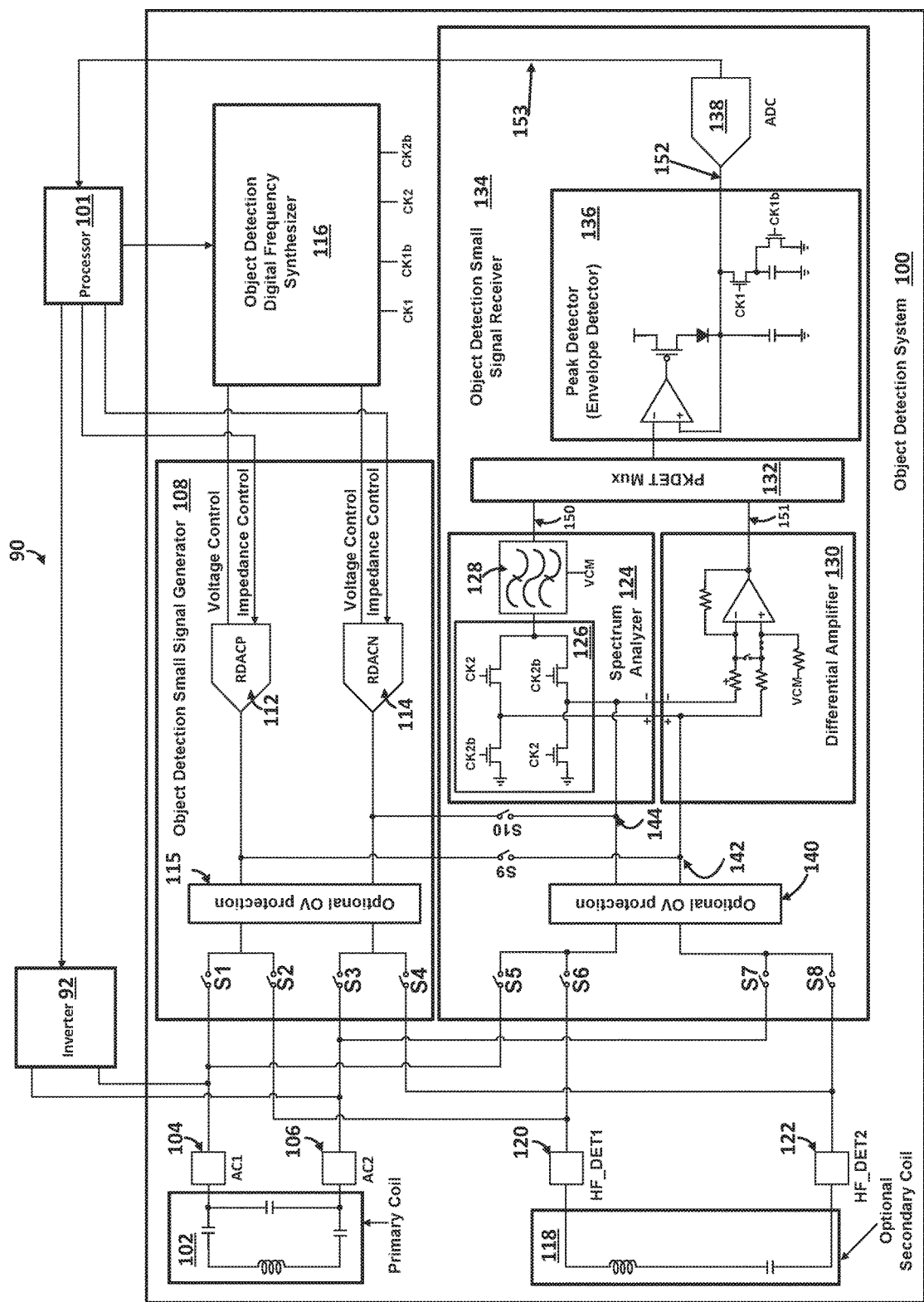
FIG. 1 is a general schematic block diagram of a power transmitter unit including an object detection system according to some embodiments.

The details of various embodiments of the methods and systems are set forth in the accompanying drawings and the description below.

DETAILED DESCRIPTION

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for providing object detection are shown according to various exemplary embodiments.

The systems and methods allow a much wider sweep frequency range (i.e., from 10 KHz to 100 MHz) than that of the conventional object detection systems (i.e., 100 kHz to 500 KHz) to improve the sensitivity of the detection and enable detecting a high-resonant-frequency foreign object (e.g., RFID tag) according to some embodiments.

The systems and methods incorporate capacitive detection (e.g., human body) and high-resonant-frequency foreign object detection which are not achieved by conventional object detection systems according to some embodiments.

The systems and methods can measure the background noise spectrum (i.e., noise spectrum from a few KHz to a few MHz) which is not achieved by the conventional object detection systems according to some embodiments.

The systems and methods excite the coils with a low-power low-distortion sinewave, so that the harmonic of the excitation signal is minimized in order to improve measurement sensitivity according to some embodiments. In some embodiments, the harmonic of an excited square wave associated with conventional systems degrades measurement accuracy.

Since the systems and methods do not need to activate a transmitter power inverter (which has lower output impedance and consumes large quiescent power) to excite the coil and do not require a boost converter (which consumes large quiescent currents and requires long wave-up time) to power the circuit, the systems and methods achieve much lower power consumption and much shorter detection time compared to conventional methods.

With different types of foreign objects present in the field, the impedance of an excitation coil of the systems and methods is different according to some embodiments. When the source impedance of the excitation signal is significant larger or smaller than the impedance of the excitation coil, the magnitude of the response signal (e.g., received signal) can be too small, which is difficult to measure according to some embodiments. The systems and methods can control the source impedance of the excitation signal to match the impedance of the excitation coil of the system for different detection operations to improve detection sensitivity according to some embodiments.

The systems and methods can control an excitation amplitude to avoid turning on the diode of the external object (e.g., a wireless power receiver unit or a foreign object) in order to improve measurement accuracy according to some embodiments. The power generated by the transmitter power inverter unit associated with object detection operations of conventional systems can easily turn on the diode of an external wireless power receiver due to its uncontrollable output impedance, which degrades the measurement accuracy.

The systems and methods include one or more circuits configured to excite a primary or a secondary coil of the power transmitter unit with a small programmable signal in some embodiments. The small programmable signal enables the systems to be a linear system according to some embodiments. The systems and methods use a low power excitation signal to reduce power consumption, and improve measurement accuracy and speed.

In some embodiments, the systems and methods can be employed to perform one or more of the following detection operations:

1) Detecting a "friend" wireless power receiver unit with or without waking it up and performing digital communications;
2) Performing an alignment test for power transmitter and receiver units to improve the power transfer efficiency;
3) Detecting a foreign object (e.g., metal) to improve the power transfer efficiency and avoid temperature raise;
4) Detecting a low-power rating foreign object (i.e., RFID tag) before power transferring, to avoid damaging the low-power rating foreign object;
5) Detecting human touch for safety concern;
6) Performing a build-in-self test in order to reduce test time and test cost (e.g., one or more circuits can test if a primary coil is properly connected, and if components of the primary coil have the right values); or
7) Measuring background noise spectrum of a system (e.g., the noise analysis is useful for system diagnostic and other high-precision circuit operation frequency selection).

Some embodiments relate to a system for detecting an object. The system includes a first coil, a second coil, and one or more circuits. The one or more circuits are configured to receive commands for the detection operations to perform; select an output impedance of the signal generator based at least in part on the operation to perform; select one of the first coil or the second coil; transmit the small signals to the selected coil; generate a small signal at one or more frequencies; receive and measure a response signal at one or more signal frequencies; determine the coil impedance at one more frequencies, or determine the background noise of a system at one or more frequencies, or determine the capacitance of the coil; compare these values (i.e., coil impedance, noise spectrum, coil capacitance) with the reference values that stored in the database; determine if a target receiver unit or foreign objects are present in the field, determine the type of the objects that are present in the field, measure the coupling coefficient (distance) between the coil and the object according to real time measured value; determine if human tissues touch the coil; determine the distance between the human and the unit according to measured capacitance; determine if the coil is properly connected in the system.

Some embodiments relate to a device for detecting an object. The device includes a first coil, a second coil, and one or more circuits. The one or more circuits are configured to receive commands for the detection operations to perform; select an output impedance of the signal generator based at least in part on the operation to perform; select one of the first coil or the second coil; transmit the small signals to the selected coil; generate a small signal at one or more frequencies; receive and measure a response signal at one or more signal frequencies; determine the coil impedance at one more frequencies, or determine the background noise of a system at one or more frequencies, or determine the capacitance of the coil; compare these values (i.e., coil impedance, noise spectrum, coil capacitance) with the reference values that stored in the database; determine if a target receiver unit or foreign objects are present in the field, determine the type of the objects that are present in the field, measure the coupling coefficient (distance) between the coil and the object according to real time measured value; determine if human tissues touch the coil; determine the distance between the human and the unit according to measured capacitance; determine if the coil is properly connected to the device.

Some embodiments relate to a wireless power transmitter unit for detecting an object. The wireless power transmitter unit includes a first coil, a second coil, and one or more circuits. The one or more circuits are configured to receive commands for the detection operations to perform; select an output impedance of the signal generator based at least in part on the operation to perform; select one of the first coil or the second coil; transmit the small signals to the selected coil; generate a small signal at one or more frequencies; receive and measure a response signal at one or more signal frequencies; determine the coil impedance at one more frequencies, or determine the background noise of a system at one or more frequencies, or determine the capacitance of the coil; compare these values (i.e., coil impedance, noise spectrum, coil capacitance) with the reference values that stored in the database; determine if a target receiver unit or foreign objects are present in the field, determine the type of the objects that are present in the field, measure the coupling coefficient (distance) between the coil and the object according to real time measured value; determine if human tissues touch the coil; determine the distance between the human and the unit according to measured capacitance; determine if the coil is properly connected to the a wireless power transmitter unit.

Some embodiments relate to a method for detecting an object. The method includes a first coil, a second coil, and one or more circuits. The one or more circuits are configured to receive commands for the detection operations to perform; select an output impedance of the signal generator based at least in part on the operation to perform; select one of the first coil or the second coil; transmit the small signals to the selected coil; generate a small signal at one or more frequencies; receive and measure a response signal at one or more signal frequencies; determine the coil impedance at one more frequencies, or determine the background noise of a system at one or more frequencies, or determine the capacitance of the coil; compare these values (i.e., coil impedance, noise spectrum, coil capacitance) with the reference values that stored in the database; determine if a target receiver unit or foreign objects are present in the field, determine the type of the objects that are present in the field, measure the coupling coefficient (distance) between the coil and the object according to real time measured value; determine if human tissues touch the coil; determine the distance between the human and the unit according to measured capacitance; determine if the coil is properly connected.

With reference to FIG. 1, a wireless power transmitter unit 90 includes a power inverter 92, a processor 101, and an object detection system 100 according to some embodiments. The power inverter 92 is used to produce an AC power by alternating its outputs between ground and supply according to some embodiments. The AC power is transmitted to a power receiver unit through a primary coil 102. The wireless power transmitter unit 90 can be a smart phone, a tablet, lap top, or a wireless charging base station according to some embodiments. The processor 101 is used to control the power inverter 92, the objection detection system 100 and other analog or digital components in the wireless power transfer unit 90.

The object detection system 100 performs object detection for the wireless power transmitter unit 90 according to some embodiments. In some embodiments, the object detection system 100 includes the primary coil 102, a secondary coil 118, a small signal generator 108, a digital synthesizer 116, and a small signal receiver 134. In some embodiments, the processor 101, the small signal generator 108, the digital synthesizer 116, and the small signal receiver 134 can be implemented in hardware, software, firmware or a combination of hardware, software and firmware. The object detection system 100 can also be used as a standalone device without the main power inverter unit 92 or other components associated with the power transmitter device 90 in some embodiments.

In some embodiments, the processor 101 controls the object detection system 100 with a firmware program. In some embodiments, the processor 101 receives instructions from a user interface or an application associated with the wireless power receiver unit 90. In some embodiments, the processor 101 includes a list of type of objects for the object detection system 100 to detect from which an object can be selected. The processor 101 can be part of or integrated with the wireless power transmitter unit 90 in some embodiments.

In some embodiments, the digital synthesizer 116 receives commands from the processor 101 indicating one or more operations for the object detection system 100 to perform, such as detecting one or more types of object, performing a build-in-self test, detecting human touch, and measuring background noise spectrum of a system. In some embodiments, the digital synthesizer 116 is programmed to generate control signals (e.g., digital codes) for the small signal generator 108 so that the small signal generator 108 generates small signal (e.g., sinewaves with small amplitude) at a desired frequency. In some embodiments, the digital synthesizer 116 generates the control signals based at least in part on the type of object to detect or the detection operations to perform. In some embodiments, the digital synthesizer 116 transmits the control signals to a positive resistive digital-to-analog converter (RDACP) 112 and a negative resistive digital-to-analog converter (RDACN) 114 of the small signal generator 108. In some embodiments, the digital synthesizer 116 generates control signals to select a frequency within a frequency range from 10 KHz to 100 MHz with 10 KHz resolution. The signal frequency as well as other parameters associated with the small signal is selected according to application of the object detection system 100 or detection operations (e.g., type of object to be detected) in some embodiments.

In some embodiments, the small signal generator 108 includes the RDACP 112, the RDACN 114, high-voltage switches S1, S2, S3, S4, and optional over voltage (OV) protection circuit 115. The small signal generator 108 provides low power sinusoidal signals to the coils 102 and/or 104 for object detection via the switches S1-4 in some embodiments. In some embodiments, the RDACP 112 and the RDACN 114 are RDACs with programmable output impedance. In some embodiments, the RDACP 112 and the RDACN 114 can be programmed to desired output impedances (e.g., 10Ω-100KΩ).

The OV protection circuit 115 is optional according to some embodiments. The OV protection circuit 115 is used for protecting the RDACP 112 and RDACN 114 from over-voltage damage when one or more of switches S1, S2, S3, and S4 are connected to the coils 102 and/or 104 (e.g., switches ON). The high-voltage signal (e.g., signals with voltage that exceeds the rating voltage of the RDACN 114 or the RDACP 112) can either be generated by the power inverter 92 or received from the primary coil 102 or the secondary coil 104 according to some embodiments. In some embodiments, the OV protection circuit 115 uses input/output (IO) devices (e.g., devices with 12-V rated voltage) to clamp an output to near 1V.

In some embodiments, the RDACP 112 and the RDACN 114 receive control signals from the processor 101 to set the desired output impedance for the small signal generator 108. In some embodiments, the output impedance of the RDACP 112 and the RDACN 114 is selected according to the detection operation to perform In some embodiments, the RDACP 112 and the RDACN 114 are programmed with same impedance. In some embodiments, the RDACP 112 and the RDACN 114 are programmed with different impedance. In some embodiments, the RDACP 112 is a RDAC with a positive output. In some embodiments, the RDACN 114 is a RDAC with a negative output. In some embodiments, the RDACN 114 and the RDACP 112 generate differential signals, common mode signals, and single-ended signals. In some embodiments, the RDACN 114 and the RDACP 112 can generate differential signals that include two signals with opposite phase (e.g., 180 degree phase difference). In some embodiments, the RDACN 114 and the RDACP 112 can generate common mode signals that include two signals in same phase (e.g., 0 degree phase difference). In some embodiments, the RDACN 114 and the RDACP 112 can generate any other types of signals that include two signals with a programmable phase difference (e.g., 0-180 degree phase difference). In some embodiments, the object detection system 100 can generate a single-ended signal using one of the RDACN 114 or the RDACP 112. In some embodiments, when the RDACN 114 is used for generating the single ended signal, the RDACP 112 is grounded or floated. Similarly, when the RDACP 112 is used for generating the single ended signal, the RDACN 114 is grounded or floated.

In some embodiments, the primary coil 102 is a larger coil compared to the secondary coil 118. In some embodiments, the primary coil 102 is configured to transmit power (e.g., square-wave signals with source impedance less than 1 generated by the inverter 92), and object detection test signals (e.g., the small signal generated by the small signal generator 108). In some embodiments, the self-resonant frequency of the secondary coil 118 is higher than that of the primary coil 102. In some embodiments, the secondary coil 118 is optional for the object detection system 100. In some embodiments, the secondary coil 118 is a small coil and is configured to transmit object detection test signals and not transmit power signals. In some embodiments, the small signal generator 108 provides a small signal at low frequency (e.g., 10 kHz-10 MHz) to the primary coil 102 for low frequency object detection. In some embodiments, the small signal generator 108 provides a small signal at high frequency (e.g., 1 MHz-100 MHz) to the secondary coil 118 for high frequency object detection.

The switches S1-S4 are controlled to select one of the primary coils 102 and the secondary coil 118 for reception of the small signal from the small signal generator 108. In some embodiments, the primary coil 102 is connected to the RDACP 112 through a chip pin 104 (e.g., pin AC1) and the switch S1. In some embodiments, the primary coil 102 is connected to the RDACN 114 through a chip pin 106 (e.g., pin AC2) and the switch S3. In some embodiments, when the switches S1 and S3 are connected (e.g., turned on), the primary coil 102 receives small signal from the small signal generator 108 for object detection. In some embodiments, when the switches S1 and S3 are disconnected (e.g., turned off), the primary coil 102 is disconnected from the small signal generator 108 and is not used for object detection.

In some embodiments, the secondary coil 118 is connected to the RDACP 112 through a chip pin 120 (e.g., pin HF_DET1) and the switch S2. In some embodiments, the secondary coil 108 is connected to the RDACN 114 through a chip pin 122 (e.g., pin HF_DET2) and the switch S4. In some embodiments, when the switches S2 and S4 are connected (e.g., turned on), the secondary coil 118 receives small signal from the small signal generator 108 and used for detecting object. In some embodiments, when the switches S2 and S4 are disconnected (e.g., turned off), the secondary coil 118 is disconnected from the small signal generator 108 and is not used for detecting object.

The small signal receiver 134 includes a spectrum analyzer 124, a differential amplifier 130, a multiplexer 132, a peak detector 136, a digital to analog converter (ADC) 138, an optional over voltage protection circuit 140, and switches S5, S6, S7, S8, S9 and S10. In some embodiments, the small signal receiver 134 receives the response signal from the primary coil 102 or the secondary coil 118, and the small signal from the small signal generator 108. In some embodiments, the spectrum analyzer 124 measures the response signal and generates a first measured signal 150. In some embodiments, the differential amplifier 130 measures the response signal and generates a second measures signal 151. In some embodiments, a peak value signal of the first measured signal 150 and/or the second measured signal 151 is determined by the peak detector 136 and output to the ADC 138. In some embodiments, the peak value signal 152 is digitized by the ADC 138. In some embodiments, the output digital data of the ADC 138 is transmitted to the digital processor 101. The digital processor 101 compares the received digital data 153 with one or more detection references that stored in its database detection system and determines if a foreign object or a target power receiver unit is present in the field, and determine the coupling coefficient between the object and the wireless power transmitter unit 90 according to the comparison. In some embodiments, the detection references can be determined according to one or more lab tests and/or manufacture tests. In some embodiments, each of the one or more reference signals is associated with an object. In some embodiments, the switches S5, S6, S7, and S8 are used to connect the primary coil 102 and the secondary coils 118 with the small signal receiver 134.

In some embodiments, the optional OV protection circuit 140 is used for protecting the spectrum analyzer 124 and the differential amplifier 130 from over voltage damage when one or multiple of the high-voltage switches S5, S6, S7, and S8 are connected to the primary coil 102 or the secondary coil 118 (e.g., ON). The high-voltage signal (e.g., signal with voltage that exceeds the rating voltage of spectrum analyzer 124 or differential amplifier 130) can either be generated by the power inverter 92 or received from the primary or secondary coil according to some embodiments. In some embodiments, the OV protection circuit 140 uses an IO device (12-V rated voltage) to clamp the output to near 1V.

In some embodiments, the switches S9 and S10 are optional and are used to perform self-calibration before the measurement. In some embodiments, the switches S9 and S10 are connected between the small signal generator 108 and the small signal receiver 134. In some embodiments, the switch S9 is connected between the RDACP 112 and a positive input 142 of the spectrum analyzer 124 and the differential amplifier 130. In some embodiments, the switch S10 is connected between the RDACN 114 and a negative input 144 of the spectrum analyzer 124 and the differential amplifier 130. In some embodiments, the small signal generator 108 generates a small signal and transmits the small signal to the small signal receiver 134 for calibration before measurement. With such calibration, some non-idealities during circuit manufacturing, such as offsets, mismatch, and circuit nonlinearity, can be eliminated.

In some embodiments, the primary coil 102 is connected to the small signal receiver 134 through the switches S5 and S7. In some embodiments, the secondary coil 118 is connected to the small signal receiver 134 through the switches S6 and S8. In some embodiments, only one of the primary coil 102 or the secondary coil 118 is used for object detection. In some embodiments, the selection of primary coil 102 and the secondary coil 118 is according to an object type of the object that the system detects. For example, for metal and wireless power receiver (WPC) receiver detection, the system 100 (via the processor 101) enables the primary coil 102 by turning on switches S1, S3, S5, S7 and turning off switches S2, S4, S6, S8 according to some embodiments. For example, for high resonant frequency object detection, the system 100 (via the processor 101) enables the secondary coil 118 by turning off switches S1, S3, S5, S7 and turning on switches S2, S4, S6, S8 according to some embodiments. For example, for background noise measurement, the system 100 (via the processor 101) can use either the primary coil 102 (e.g., for measuring low frequency noise) or the secondary coil 118 (e.g., for measuring high frequency noise) according to some embodiments.

In some embodiments, when the primary coil 102 is used for detection, at least one of the switches S1 and S5, or the switches S3 and S7 are connected. Similarly, when the secondary coil 118 is used for detection, at least one of the switches S2 and S6, or switches S4 and S8 are connected according to some embodiments. In some embodiments, only one of the primary coil 102 or the secondary coil 118 is connected to both of the small signal generator 108 and the small signal receiver 134 for detection according to some embodiments.

In some embodiments, the spectrum analyzer 124 provides the first measured signal 150 to the multiplexer 132. The spectrum analyzer 124 can be configured to operate in a differential mode or a single-ended mode according to some embodiments. For differential mode, the amplitude of the first measured signal 150 is equal to an amplitude of the voltage difference between the positive input 142 and the negative input 144 at desired frequencies according to some embodiments. For single-ended mode, the amplitude of first measured signal 150 is equal to the amplitude of the voltage difference between one of the inputs (one of 142 and 144) and the common mode voltage VCM at desired frequencies according to some embodiments. In some embodiments, the spectrum analyzer 124 measures the signal spectrum of the response signal from the primary coil 102 or the secondary coil 118. In some embodiments, the spectrum analyzer 124 includes a frequency mixer 126 and a band-pass filter 128. In some embodiments, the spectrum analyzer 124 is configured to measure a signal magnitude of the response signal at one or more desired frequencies. The desired frequencies are controlled by the frequencies of the switch CK2 and the switch CK2B, which are generated by the digital frequency synthesizer 116 according to some embodiments. In some embodiments, the narrow band filter 128 is configured to filter out undesired frequency components from the mixed signals.

In some embodiments, the differential amplifier 130 provides a second measured signal 151 to the multiplexer 132. The differential amplifier 130 can be configured to a differential mode or a single-ended mode according to some embodiments. For differential input mode, the differential amplifier 130 amplifies the differential voltage from the primary coil 102 or the secondary coil 118 and outputs the second measured voltage 151 to the multiplexer 134 according to some embodiments. For single-ended mode, the differential amplifier 130 amplifies the difference between single-ended voltage from the primary coil 102 or the secondary coil 118 and the common mode voltage, and outputs the second measured voltage 151 to the multiplexer 134 according to some embodiments. In some embodiments, the differential amplifier 130 provides built-in low-pass/ high-pass, band-pass, and all pass functions.

In some embodiments, the second measured signal 151 is noisier compared to the first measured signal 150, since the frequency mixer 126 selects the desired frequency components of the input signals (e.g., signals input at 142 and 144) and the narrow band filter 128 rejects the undesired frequency components of the input signals. In some embodiments, the spectrum analyzer 124 is slower to provide a measured signal compared to the differential amplifier 130 due to increased complexity of the signal processing (e.g., noise filtering operation).

In some embodiments, the multiplexer 132 is used for selecting one of the first measured signal 150 provided by the spectrum analyzer 124 or the second measured signal 151 provided by the differential amplifier 130. In some embodiments, the multiplexer 132 selects the measured signal according to the detection operation (e.g., type of the object to be detected) and the environment of the object detection system 100 (e.g., if the environment is noisy, the spectrum analyzer output 150 is selected). In some embodiments, the multiplexer 132 outputs the selected measured signal to the peak detector 136.

In some embodiments, the peak detector 136 determines a voltage envelope (e.g., magnitude) of the selected measured signal from the multiplexer 132. In some embodiments, the peak detector 136 has a wide range of programmable decaying frequency from 10 Hz to 100 KHz. In some embodiments, the decaying frequency can also be selected to auto-track the frequency of the small signal generator 108. In some embodiments, the decaying frequency is controlled by signal at the switch CK1 and the switch CK1b, which are generated by the digital synthesizer 124. Higher decaying frequency results faster measurement speed, while lower decaying frequency results better measurement accuracy according to some embodiments. With a programmable decaying bandwidth or auto-tracking function embedded in the peak detector 136, optimized decaying bandwidth can be selected according to some embodiments. The optimized decaying bandwidth is determined by the frequencies of the small signal chosen to excite the primary coil 102 or the secondary coil 118 according to some embodiments. The use of the peak detector 136 significantly relaxes the sampling speed of the ADC 138, which significantly reduces the power consumption according to some embodiments.

By excitation and measuring the response at one or more frequencies, the object detection system 100 can measure impedance, capacitance, and background noise of the primary coil 102 or the secondary coil 118 according to some embodiments. The impedance of the primary coil 102 or the secondary coil 118 is associated with the type of object to be detected and the coupling coefficient (distance) between the wireless power transmitter unit 90 and the object to be detected according to some embodiments. The capacitance of the primary coil 102 or the secondary coil 118 is associated with human touch of the wireless power transmitter unit 90 and a distance between human and the wireless power transmitter unit 90 according to some embodiments. The background noise is associated with the operating environment of the object detection system 100, such as an operation of the neighboring circuits and systems according to some embodiments.

In some embodiments, the object detection system 100 can be configured for capacitive sensing. When the object detection system 100 is used for capacitive sensing, the digital frequency synthesizer 116 controls the small signal generator 108 to generate a single-ended sine-wave signal at a desired frequency (e.g., 10 MHz). In some embodiments, the RDACP 112 or the RDACN 114 are programmed with 1KΩ output impedance. In some embodiments, the switches S2 and S6 are connected, and the switches S1, S3, S4, S5, S7, S8, S9, and S10 are disconnected. In some embodiments, the secondary coil 118 is used for object detection. In some embodiments, the small signal receiver 134 receives the single-ended signal and transmits the measured data 153 to the processor 101. In some embodiments, the processor 101 determines the measured capacitance value or a sudden change in measured capacitance value according to the real-time measured data 153. In some embodiments, the measured capacitance or a change in measured capacitance is compared with a reference value to detect a human hand touch and determine a distance between human hand and the wireless power transmitter unit 90. In some embodiments, the reference capacitance value is associated with one or more lab measurements or factory calibration.

In some embodiments, the object detection system 100 can be configured for metal detection. In some embodiments, when the object detection system 100 is used for metal detection, the digital frequency synthesizer 116 controls the small signal generator 108 to generate a differential sine-wave signal at a desired frequency. In some embodiments, the RDACP 112 and the RDACN 114 are programmed with 1KΩ output impedance. In some embodiments, the switches S1, S3, S5, and S7 are connected, and the switches S2, S4, S6, S8, S9, and S10 are disconnected. In some embodiments, the primary coil 102 is used for metal detection. In some embodiments, the small signal receiver 134 receives the differential signal from the primary coil 102 and transmits the measured data 153 to the processor 101. In some embodiments, the above excitation and measurement are repeated at one or more frequencies of the sine-wave generated by the small signal generator 108. In some embodiments, the frequencies of the sine-wave are in the range of 10 KHz to 2 MHz with a 10 KHz frequency step (e.g., 10 KHz, 20 KHz . . . 1.9 MHz, 2 MHz). In some embodiments, the processor 101 determines the measured impedance of the primary coil 102 versus frequency (e.g., frequency response). In some embodiments, the measured frequency response is compared to a reference frequency response to determine if an object (e.g., a key, a coin, etc.) is present in the field. In some embodiments, the reference frequency response is associated with one or more lab measurements or factory calibration.

In some embodiments, the object detection system 100 can be configured for power receiver detection and performing alignment test. In some embodiments, when the object detection system 100 is used for power receiver detection, the digital frequency synthesizer 116 controls the small signal generator 108 to generate a differential sine-wave signal at a desired frequency. In some embodiments, the RDACP 112 and the RDACN 114 are programmed with 50-Ω impedance. In some embodiments, the switches S1, S3, S5, and S7 are connected, and the switches S2, S4, S6, S8, S9, and S10 are disconnected. In some embodiments, the primary coil 102 is used for power receiver detection and performing alignment test. In some embodiments, the small signal receiver 134 receives the differential signal from the primary coil 102 and transmits the measured data to the processor 101. In some embodiments, the above excitation and measurement are repeated at one or more frequencies of the sine-wave generated by the small signal generator 108. In some embodiments, the frequency sweep range of the sine-wave is from 10 KHz to 2 MHz with a 10 KHz frequency step (e.g., 10 KHz, 20 KHz . . . 1.9 MHz, 2 MHz). In some embodiments, the processor 101 determines the measured impedance of the coil versus frequency (e.g., frequency response). In some embodiments, the measured frequency response is compared to a reference frequency response to determine if a WPC receiver is present in the field and the coupling coefficient (e.g., alignment coefficient) between the power transmit unit and the receiver. In some embodiments, the reference frequency response is associated with one or more lab measurements or factory calibration.

In some embodiments, the object detection system 100 can be configured for built in self-test. In some embodiments, when the object detection system 100 is configured for built in self-test, the digital frequency synthesizer 116 controls the small signal generator 108 to generate a differential sine-wave signal at a desired frequency. In some embodiments, the RDACP 112 and the RDACN 114 are programmed with 50Ω output impedance. In some embodiments, the switches S1, S3, S5, and S7 are connected, and the switches S2, S4, S6, S8, S9, and S10 are disconnected. In some embodiments, the impedance of the primary coil 102 is measured. In some embodiments, the small signal receiver 134 receives the differential signal from the primary coil 102 and transmits the measured data to the processor 101. In some embodiments, the above excitation and measurement are repeated at one or more frequencies of the sine-wave generated by the small signal generator 108. In some embodiments, the frequencies of the sine-wave are in the range of 10 KHz to 2 MHz with a 10 KHz frequency step (e.g., 10 KHz, 20 KHz . . . 1.9 MHz, 2 MHz). In some embodiments, the processor 101 determines the measured impedance of the primary coil 102 versus frequency (e.g., frequency response). In some embodiments, the measured frequency response is compared to a reference frequency response to determine if the primary coil 102 is properly connected. In some embodiments, the reference frequency response is associated with the value of the components that used in the coil.

In some embodiments, the object detection system 100 can be configured for noise spectrum measurement. In some embodiments, when the object detection system 100 is used for noise spectrum measurement, the small signal generator 108 is turned off by disconnecting the switches S1, S2, S3, S4, S9 and S10. In some embodiments, when the object detection system 100 uses the primary coil 102 to measure the noise, switches S5 and S7 are connected, and switches S1, S2, S3, S4, S6, S8, S9, and S10 are disconnected. In some embodiments, when the object detection system 100 uses the secondary coil 118 to measure the noise, switches S6 and S8 are connected, and switches S1, S2, S3, S4, S5, S7, S9, and S10 are disconnected. The noise signals can be analyzed using the spectrum analyzer 124 in some embodiments. The noise measurement is useful for system diagnostic.

In some embodiments, the object detection system 100 can be configured for self-calibration and reference measurement. In some embodiments, when the object detection system 100 is used for self-calibration and reference measurement, the switches S9 and S10 are connected, and the switches S1, S2, S3, S4, S5, S6, S7, and S8 are disconnected. In some embodiments, the small signal generator 108 generates a small signal and transmits the small signal to the small signal receiver 134 through the S9 and S10 connection. In some embodiments, the object detection system 100 performs reference measurement/self-calibration prior to the actual measurement, so that the offset and gain error due to IC process variation can be extracted and removed.

Figure 2:
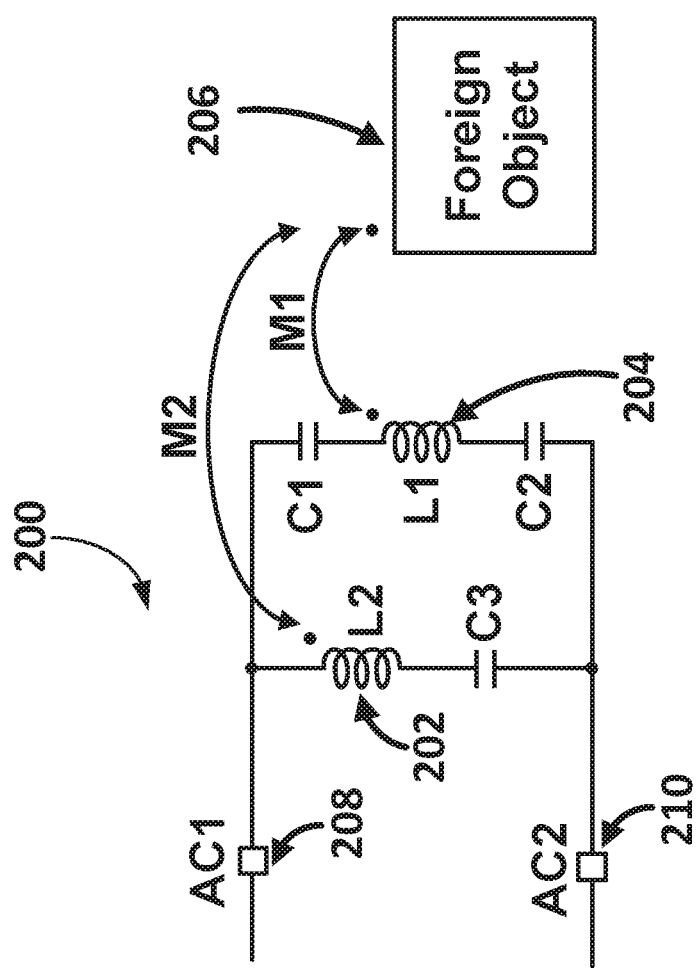
FIG. 2 is a general schematic block diagram of a dual coil circuit for the object detection system illustrated in FIG. 1 according to some embodiments.

With reference to FIG. 2, a dual coil circuit 200 for an object detection system 100 is shown according to some embodiments. The dual coil circuit 200 is used for detecting a foreign object 206 according to some embodiments. The dual coil circuit 200 includes a first coil 202 and a second coil 204 according to some embodiments. In some embodiments, the first coil 202 (e.g., a 1 uH coil) is smaller than the second coil 204 (e.g., a 10 uH coil). In some embodiments, the first coil 202 and the second coil 204 are in parallel connection. In some embodiments, the first coil 202 is used for exciting high frequency signals to detect the foreign object 206. In some embodiments, the second coil 204 is used for exciting low frequency signals to detect the foreign object 206. In some embodiments, the second coil 204 is also used to transmit the wireless power to the wireless receiver. In some embodiments, the dual coil circuit 200 is connected to the chip pins 104 and 106 of the wireless transmitter unit 90 and the chip pins 120 and 122 are not used. With dual coil configuration, the number of chip pins used in the wireless transmitter unit 90 is reduced, which reduces the cost and size of the wireless transmitter unit 90 according to some embodiments.

Figure 3:
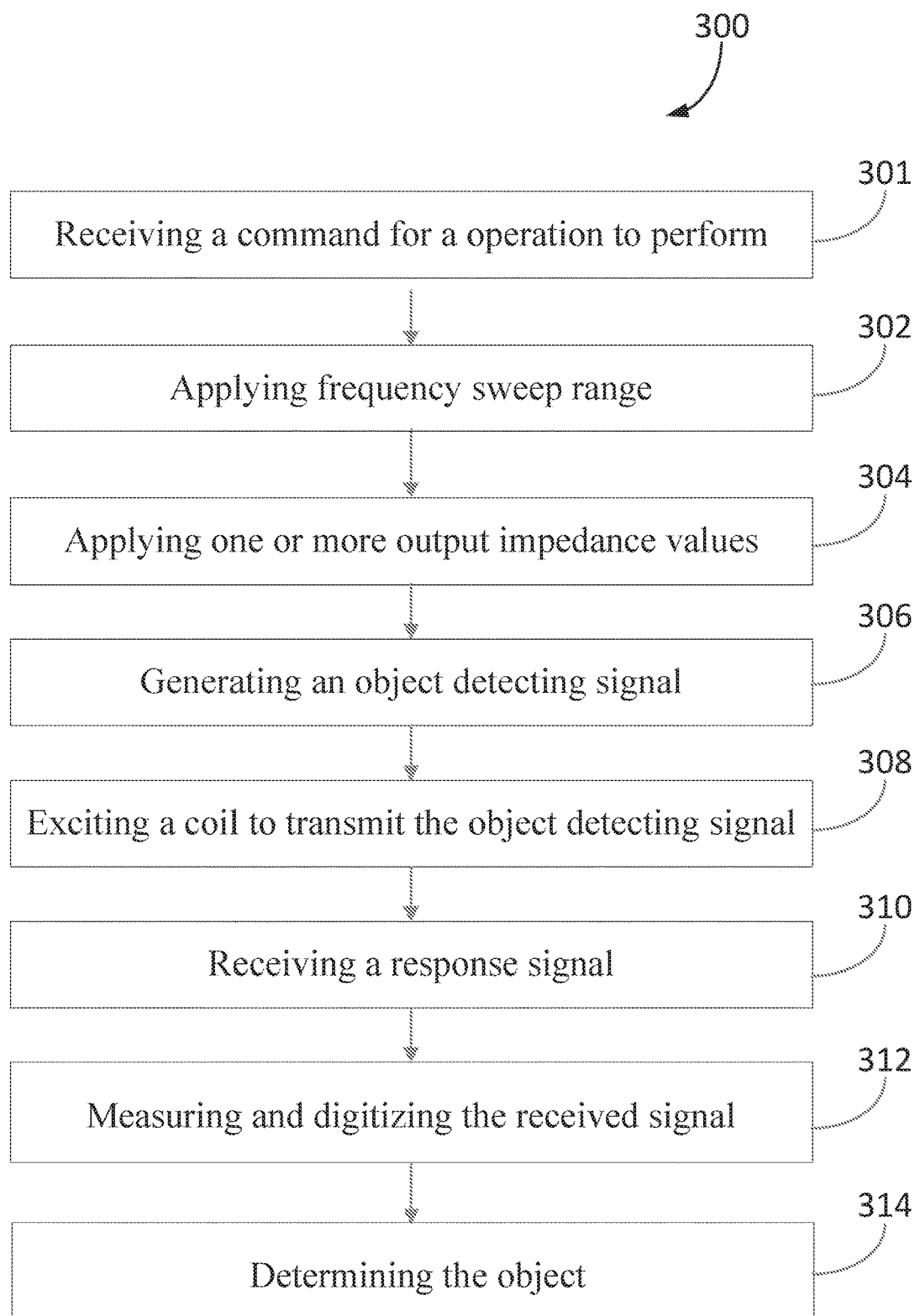
FIG. 3 is a flow diagram of operations for providing object detection according to some embodiments.

With reference to FIG. 3, a flow 300 of operations of an object detection system in wireless charging system that detects a nearby object is shown according to some embodiments. In some embodiments, the object detection system can be implemented in hardware, software, firmware or a combination of hardware, software and firmware.

At an operation 301, the object detection system receives one or more commands indicating operations for the object detection system to perform according to some embodiments. In some embodiments, the one or more commands are input by a user. In some embodiments, the one or more commands are programmed in the object detection system. For example, the wireless power transmitter system includes a list of detection operations that arranged in an order for the object detection system to perform according to some embodiments.

At an operation 302, a frequency sweep range and a frequency sweep step are applied to the object detection system. In some embodiments, the frequency sweep range is input by the user. In some embodiments, the frequency sweep range is determined by the object detection system according to the detection operation to perform.

At an operation 304, one or more output impedance values are applied to the object detection system. In some embodiments, the one or more output impedance values are input by the user. In some embodiments, the one or more output impedance values are determined by the system according to the detection operation to perform.

At an operation 306, one or more object detecting signals are generated by the object detection system using the one or more output impedance values and at one or more frequencies according to some embodiments. The one or more object detecting signals are sinusoidal signals according to some embodiments.

At an operation 308, the object detection system excites a coil with the one or more object detecting signals according to some embodiments. The object detection system selects a first coil or a second coil to excite according to the frequency of the object detecting signal in some embodiments. The object detection system selects the first coil or the second coil to excite according to types of detection operation in some embodiments. The object detection system selects the first coil or the second coil to excite according to user's input in some embodiments. The coil is selected by connecting and/or disconnecting one or more switches in the object detection system according to some embodiments.

At an operation 310, the object detection system receives one or more response signals or one or more background noise signals from the selected coil according to some embodiments.

At an operation 312, the object detection system measures the one or more response signals and the one or more background noise signals according to some embodiments. The one or more response signals and the one or more background noise signals can be measured by either a differential amplifying operation or a spectrum analysis operation according to some embodiments. The amplitude of the output of differential amplifying operation or a spectrum analysis operation is obtained through a peak detector according to some embodiments. The output of the peak detector is digitized using an analog to digital converter according to some embodiments. The output data of the analog to digital converter are transmitted to a processor of the wireless charging system according to some embodiments.

At an operation 314, the object detection system compares the measured data with the reference data that stored in a data base and determines if a target receiver unit or foreign objects are present in the field. The object detection system can also determine the type of the object that is present in the field according to the comparison according to some embodiments. The object detection system can also measure the coupling coefficient (distance) between the wireless power transmitter system and the object according to measured value in real time according to some embodiments. The object detection system can also determine if human tissues touch the wireless power transmitter system based on the comparison according to some embodiments. The object detection system can also determine a distance between the human and the wireless power transmitter system according to measured capacitance in real time.

Although the disclosure might reference one or more "users", such "users" can refer to user-associated devices, for example, consistent with the terms "user" and "multi-user" typically used in the context of a MU-MIMO environment. Although examples of communications systems described above can include devices and access points operating according to an IEEE 802.11, 3 GPP or LTE standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, arrays, direction, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

The invention claimed is:

1. A device, comprising:
a first coil and a second coil;
a main transmit inverter circuit configured to provide a power signal to one of the first coil or the second coil; and
one or more circuits configured to:
select one of the first coil or the second coil as a selected coil;
select an output impedance to apply to the selected coil;
apply the selected output impedance to the selected coil;
provide a small signal to the selected coil with the selected output impedance;
receive a response signal in response to the small signal;
compare the response signal with one or more reference signals; and
detect an object according to the comparison.

2. The device of claim 1, wherein the one or more circuits are configured to:
receive one or more commands indicating one or more detection operations to perform;
select the one of the first coil or the second coil as the selected coil according to the one or more detection operations to perform;
select an output impedance to apply to the selected coil according to the one or more detection operations to perform; and
transmit the small signal using the selected coil.

3. The device of claim 2, wherein the first coil has a lower self-resonant frequency compared to the second coil.

4. The device of claim 2, wherein the one or more circuits comprise a digital synthesizer, a first resistive digital-to-analog converter (RDAC), and a second RDAC.

5. The device of claim 4, wherein the digital synthesizer is configured to generate one or more control signals for generating the small signal and transmit the one or more control signals to the first RDAC and the second RDAC.

6. The device of claim 5, wherein the first RDAC and the second RDAC are configured to generate the small signal based at least in part on the one or more control signals and the selected output impedance.

7. The device of claim 4, wherein the one or more circuits are configured to apply the selected output impedance at the first RDAC and the second RDAC according to the one or more detection operations.

8. The device of claim 1, wherein the one or more circuits are further configured to measure a coupling coefficient between the object and the selected coil according to the comparison.

9. A wireless power transmitter device, comprising:
a first coil and a second coil;
a main transmit inverter circuit configured to provide a power signal to one of the first coil or the second coil; and
one or more circuits configured to:
 select one of the first coil or the second coil as a selected coil;
 select an output impedance to apply to the selected coil;
 apply the selected output impedance to the selected coil;
 provide a small signal to the selected coil with the selected output impedance;
 receive a response signal in response to the small signal;
 compare the response signal with one or more reference signals;
 determine whether one or more objects are present according to the comparison; and
 in response to determining the one or more objects are present, determine a type of the one or more objects according to the comparison.

10. The wireless power transmitter device of claim 9, wherein the first coil has a lower self-resonant frequency compared to the second coil.

11. The wireless power transmitter device of claim 9, wherein the one or more circuits comprise a digital synthesizer, a first resistive digital-to-analog converter (RDAC), and a second RDAC, wherein the digital synthesizer is configured to generate one or more control signals for generating the small signal and transmit the one or more control signals to the first RDAC and the second RDAC.

12. The wireless power transmitter device of claim 11, wherein the one or more circuits are configured to apply one or more impedance values-at the first RDAC and the second RDAC.

13. The wireless power transmitter device of claim 12, wherein the first RDAC and the second RDAC are configured to generate the small signal based at least in part on the one or more control signals and a selected output impedance of the one or more impedance values.

14. The wireless power transmitter device of claim 9, wherein the one or more circuits are further configured to:
determine whether a frequency of the small signal is larger than a threshold;
in response to determining that the frequency is equal to or higher than the threshold, select the second coil; and
in response to determining that the frequency is lower than the threshold, select the first coil.

15. A wireless power transmitter device, comprising:
at least one coil;
a main transmit inverter circuit configured to provide a power signal to the at least one coil; and
one or more circuits configured to:
 generate a small signal;
 provide the small signal to the at least one coil;
 receive a response signal;
 compare the response signal with one or more reference signals;
 determine whether one or more objects are present according to the comparison; and
 in response to determining the one or more objects are present, determine a type of the one or more objects according to the comparison, wherein the determinations are made without providing a signal from the main transmit inverter circuit to the at least one coil, wherein the one or more circuits comprise a digital synthesizer, a first resistive digital-to-analog converter (RDAC), and a second RDAC.

16. A method of detecting an object, comprising:
receiving, at one or more circuits, a command to initiate an operation to detect one or more objects;
generating, by the one or more circuits, a small signal based at least in part on the operation;
selecting, by the one or more circuits, one of a first coil or a second coil as a selected coil;
selecting, by the one or more circuits, an impedance to apply to the selected coil;
applying, by the one or more circuits, the selected impedance to the selected coil;
transmitting, by the one or more circuits, the small signal using the selected coil with the selected impedance;
receiving, by the one or more circuits, a response signal in response to the small signal;
comparing, by the one or more circuits, the response signal with one or more reference signals; and
determining, by the one or more circuits, the one or more objects according to the comparison.

17. The method of claim 16, wherein the first coil has a lower self-resonant frequency compared to the second coil.

18. The method of claim 16, further comprising generating one or more control signals for generating the small signal.

19. The method of claim 18, further comprising generating the small signal based at least in part on the one or more control signals and the selected impedance.

20. The method of claim 16, further comprising:
determining whether a frequency of the small signal is larger than a threshold;
in response to determining that the frequency is equal to or higher than the threshold, selecting the second coil; and
in response to determining that the frequency is lower than the threshold, selecting the first coil.

* * * * *